United States Patent
Bachar et al.

(10) Patent No.: US 9,770,738 B2
(45) Date of Patent: Sep. 26, 2017

(54) METHOD OF PRODUCING AN ELECTROSTATIC INK COMPOSITION

(71) Applicant: Hewlett-Packard Indigo B.V., Amstelveen (NL)

(72) Inventors: Eyal Bachar, Modi'in (IL); Marc Klein, Tal Aviv (IL); Albert Teishev, Rishon le-zion (IL); Hanit Marom Tchaicheeyan, Nez Ziona (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 19 days.

(21) Appl. No.: 14/888,407

(22) PCT Filed: Jul. 17, 2013

(86) PCT No.: PCT/EP2013/065073
§ 371 (c)(1),
(2) Date: Oct. 30, 2015

(87) PCT Pub. No.: WO2015/007313
PCT Pub. Date: Jan. 22, 2015

(65) Prior Publication Data
US 2016/0068692 A1    Mar. 10, 2016

(51) Int. Cl.
| B05D 1/02 | (2006.01) |
| C09D 11/03 | (2014.01) |
| C09D 11/033 | (2014.01) |
| G03G 9/125 | (2006.01) |
| G03G 9/135 | (2006.01) |

(Continued)

(52) U.S. Cl.
CPC ............... B05D 1/02 (2013.01); C08K 5/521 (2013.01); C09D 11/02 (2013.01); C09D 11/03 (2013.01); C09D 11/033 (2013.01); G03G 9/125 (2013.01); G03G 9/1355 (2013.01)

(58) Field of Classification Search
None
See application file for complete search history.

(56) References Cited

U.S. PATENT DOCUMENTS

| 2,790,776 A | 4/1957 | Savage et al. |
| 4,476,212 A | 10/1984 | Kakimi |

(Continued)

FOREIGN PATENT DOCUMENTS

| CN | 103080846 | 5/2013 |
| GB | 2107480 | 4/1983 |

(Continued)

OTHER PUBLICATIONS

ExxonMobil Lubricants & specialities, Marcol 82; 2003, obtained on-line from Exxon Mobil website.

(Continued)

*Primary Examiner* — Michael P Rodriguez
(74) *Attorney, Agent, or Firm* — HP Inc. Patent Department

(57) ABSTRACT

A method of producing an electrostatic ink composition, the method comprising: providing a precursor ink composition comprising a resin and a pigment dispersed in a liquid carrier; wherein the precursor ink composition comprises 30 wt % or more non-volatile solids; and spraying a lubricating liquid onto the surface of the precursor ink composition to form the electrostatic ink composition.

19 Claims, 3 Drawing Sheets

(51) Int. Cl.
   *C08K 5/521*   (2006.01)
   *C09D 11/02*   (2014.01)

(56) References Cited

U.S. PATENT DOCUMENTS

| | | |
|---|---|---|
| 5,474,603 A | 12/1995 | Miyashita et al. |
| 5,774,771 A | 6/1998 | Kukimoto et al. |
| 6,739,256 B1 * | 5/2004 | Murakawa ............ B41F 31/005 |
| | | 101/350.5 |
| 2012/0231237 A1 * | 9/2012 | Ron .................... B41M 7/0054 |
| | | 428/201 |
| 2013/0223887 A1 | 8/2013 | Bachar et al. |

FOREIGN PATENT DOCUMENTS

| | | | | |
|---|---|---|---|---|
| WO | 2007130069 | 11/2007 | | |
| WO | 2008020925 | 2/2008 | | |
| WO | 2008054386 | 5/2008 | | |
| WO | 2010018806 | 2/2010 | | |
| WO | 2011110221 | 9/2011 | | |
| WO | WO 2011110221 A1 * | 9/2011 | ........... | C09D 11/033 |
| WO | 2013044991 | 4/2013 | | |
| WO | 2013091667 | 6/2013 | | |

OTHER PUBLICATIONS

ExxonMobil, Material Safety Data Sheet, Isopar L Fluid, May 12, 2010; obtained on-line from Exxon Mobil website.
Manual on Hydrocarbon Analysis, http://books.google.co.uk/books?id=CsX9-LVP7WYC&dq=%22carbon+type%22+pa, Apr. 7, 2013.

* cited by examiner

METHOD OF PRODUCING AN ELECTROSTATIC INK COMPOSITION

BACKGROUND

Electrostatic printing processes, sometimes termed electrophotographic printing processes, typically involve creating an image on a photoconductive surface, applying an ink having charged particles to the photoconductive surface, such that they selectively bind to the image, and then transferring the charged particles in the form of the image to a print substrate.

The photoconductive surface is typically on a cylinder and is often termed a photo imaging plate (PIP). The photoconductive surface is selectively charged with a latent electrostatic image having image and background areas with different potentials. For example, an electrostatic ink composition including charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member, which can be a soft swelling blanket, and then to the print substrate.

DETAILED DESCRIPTION

Figure 1:
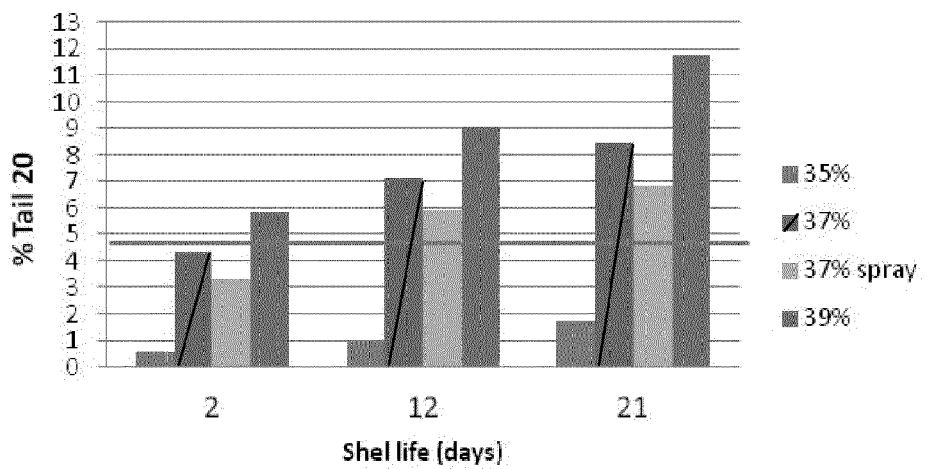
FIG. 1 shows High Tail values (%) for black, yellow and cyan inks at various % NVS during shelf-life time (days) at 45° C., in one example having been sprayed with Marcol and NCD. High tails value indicates the population (in terms of relative volume) with a size of more than 20 micron. A high tails value indicates a high amount of agglomeration of the particles in the ink.
Figure 1:
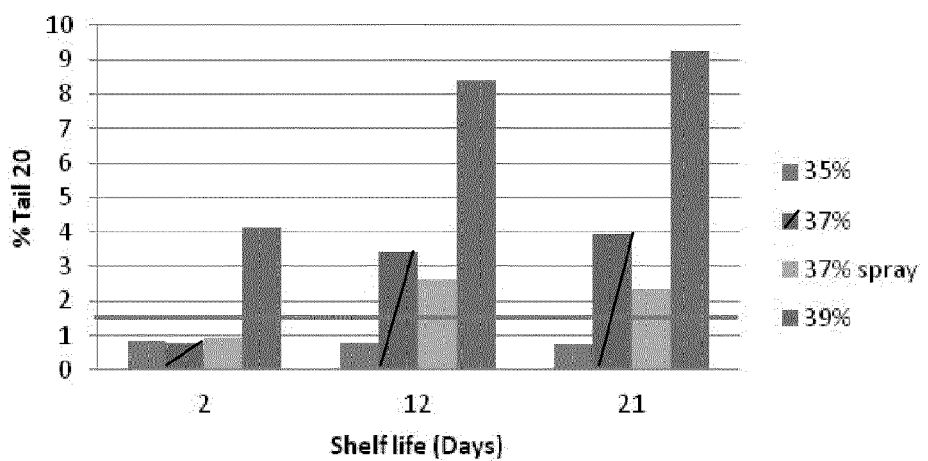
Figure 1:
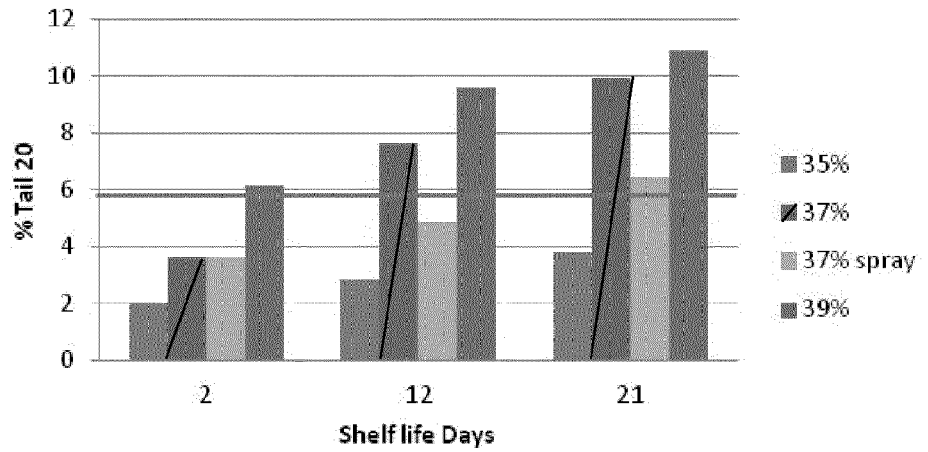

Before the methods and related aspects are disclosed and described, it is to be understood that this disclosure is not limited to the particular process steps and materials disclosed herein because such process steps and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "liquid carrier", "liquid carrier," "carrier," or "carrier vehicle" refers to the fluid in which the polymers, particles, colorant, charge directors and/or other additives can be dispersed to form a liquid electrostatic ink or electrophotographic ink. Liquid carriers can include a mixture of a variety of different agents, such as surfactants, co-solvents, viscosity modifiers, and/or other possible ingredients.

As used herein, "electrostatic ink composition" generally refers to a ink composition, which may be in liquid form, that is typically suitable for use in an electrostatic printing process, sometimes termed an electrophotographic printing process. The electrostatic ink composition may include chargeable particles of a resin, which may be as described herein, dispersed in a liquid carrier, which may be as described herein.

As used herein, "pigment" generally includes pigment colorants, magnetic particles, aluminas, silicas, and/or other ceramics or organo-metallics, whether or not such particulates impart color. Thus, though the present description primarily exemplifies the use of pigment colorants, the term "pigment" can be used more generally to describe not just pigment colorants, but other pigments such as organometallics, ferrites, ceramics, etc.

As used herein, "co-polymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic(ally) printing" or "electrophotographic(ally) printing" generally refers to the process that provides an image that is transferred from a photo imaging substrate or plate either directly or indirectly via an intermediate transfer member to a print substrate, e.g. a paper substrate. As such, the image is not substantially absorbed into the photo imaging substrate or plate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrostatic ink composition to an electric field, e.g. an electric field having a field strength of 1000 V/cm or more, in some examples 1000 V/mm or more.

As used herein, the term "about" is used to provide flexibility to a numerical range endpoint by providing that a given value may be a little above or a little below the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

Unless otherwise stated, any feature or embodiment described herein can be combined with any other feature or embodiment described herein.

There is provided a method of producing an electrostatic ink composition, the method involving:
providing a precursor ink composition including a resin and a pigment dispersed in a liquid carrier; wherein the precursor ink composition includes 30 wt % or more non-volatile solids; and
spraying a lubricating liquid onto the surface of the precursor ink composition to form the electrostatic ink composition.

An electrostatic ink composition which contains a relatively high percentage of non volatile solids (% NVS), e.g. 30 wt % or more (in some examples around 37 wt %) is desirable in order to save printing, packaging and transport costs. However, the solids in such inks have an increased tendency to aggregate, which can lead to poor print quality, print apparatus failure, and a short shelf-life of the inks themselves. It has been found that by spraying a lubricating liquid onto the surface of an electrostatic ink composition containing a relatively high amount of solids, the propensity of the solids to aggregate over a given period seems to decrease.

In some examples of the method, the lubricating liquid is or includes a liquid that has a higher kinematic viscosity, as measured at 25° C., than the liquid carrier. In some examples of the method, the lubricating liquid is or includes a liquid that has a kinematic viscosity, as measured at 25° C., that is at least twice that of the liquid carrier. In some examples of the method, the lubricating liquid is or includes a liquid that has a kinematic viscosity, as measured at 25° C., that is at least five times that of the liquid carrier. In some examples of the method, the lubricating liquid is or includes a liquid that has a kinematic viscosity, as measured at 25° C., that is at least eight times that of the liquid carrier. In some examples of the method, the lubricating liquid is or includes a liquid that has a kinematic viscosity, as measured at 25° C., that is at least ten times that of the liquid carrier.

In some examples, the lubricating liquid includes a first liquid that has a higher kinematic viscosity, as measured at 25° C., than the liquid carrier, and a second liquid, which may be the same as the liquid carrier, and in some examples; and in some examples the lubricating liquid containing a combination of the first and second liquids has a higher kinematic viscosity, as measured at 25° C., than the liquid carrier. The second liquid may act as a diluents for the first liquid, and, in some examples, first and second liquids are miscible in one another. First and second liquids may both be hydrocarbon liquids. First and second liquids may be present in a wt % ratio of 1:1 to 1:25, in some examples 1:5 to 1:20, in some examples 1:8 to 1:16, in some examples 1:9 to 1:15, in some examples about 1:10 to 1:14.

In some examples, the lubricating liquid or the first liquid is or includes a liquid that has a kinematic viscosity, as measured at 25° C., that is 3 $mm^2/s$ or more, in some examples 5 $mm^2/s$ or more, in some examples 7 $mm^2/s$ or more, in some examples 9 $mm^2/s$ or more, in some examples 11 $mm^2/s$ or more, in some examples 13 $mm^2/s$ or more. In some examples, the carrier liquid has a kinematic viscosity, as measured at 25° C., that is 6 $mm^2/s$ or less, in some examples 4 $mm^2/s$ or less, in some examples 3 $mm^2/s$ or less, in some examples 2 $mm^2/s$ or less. In some examples, the lubricating liquid or the first liquid is or includes a liquid that has a kinematic viscosity, as measured at 25° C., that is 6 $mm^2/s$ or more and the carrier liquid has a kinematic viscosity, as measured at 25° C., that is 6 $mm^2/s$ or less. In some examples, the lubricating liquid or the first liquid is or includes a liquid that has a kinematic viscosity, as measured at 25° C., that is 8 $mm^2/s$ or more and the carrier liquid has a kinematic viscosity, as measured at 25° C., that is 4 $mm^2/s$ or less. In some examples, the lubricating liquid or the first liquid is or includes a liquid that has a kinematic viscosity, as measured at 25° C., that is 10 $mm^2/s$ or more and the carrier liquid has a kinematic viscosity, as measured at 25° C., that is 3 $mm^2/s$ or less, in some examples 2 $mm^2/s$ or less.

Kinematic viscosities mentioned herein, unless otherwise indicated, are measured using ASTM D445-12, at a particular temperature. The particular temperature may, for example, be a temperature of 25° C., or in some examples 40° C., or in some examples 100° C. For the avoidance of doubt, when a kinematic viscosity as measured at a particular temperature is disclosed herein, this indicates the temperature at which the kinematic viscosity of the relevant liquid, e.g. liquid carrier or lubricating liquid, in its pure form (i.e. without any other component of the precursor, electrostatic ink composition or lubricating liquid present in the liquid carrier) is measured, but this does not imply that method of producing the electrostatic ink composition was carried out at that temperature.

In some examples of the method, the liquid carrier includes or is an isoparaffinic liquid, which may contain naphthenic species. In some examples, the lubricating liquid is or includes a paraffinic liquid, which may contain naphthenic species. A paraffinic liquid may be a liquid that includes, consists essentially of or consists of straight-chain alkane species. Isoparaffinic liquid may indicate a liquid that includes, consists essentially of, or consists of branched alkane species. Naphthenic species may indicate cycloalkane species.

In some examples, the liquid carrier includes, consists essentially of or consists of alkanes. "Consists essentially of" in this context may indicate that the liquid may contain at least 90 wt % alkanes, in some examples at least 95 wt % alkanes, in some examples at least 98 wt % alkanes.

In some examples, the lubricating liquid includes, consists essentially of or consists of alkanes. "Consists essentially of" in this context may indicate that the carrier liquid may contain at least 90 wt % alkanes, in some examples at least 95 wt % alkanes, in some examples at least 98 wt % alkanes.

In some examples of the method, the liquid carrier includes or is an isoparaffinic liquid and the lubricating liquid is or includes a paraffinic liquid, which may contain naphthenic species. In some examples, a paraffinic liquid is a liquid containing more than 50 wt % paraffin (i.e. straight-chain alkane) molecules. In some examples, an isoparaffinic liquid is a liquid containing more than 50 wt % isoparaffin (i.e. branched-chain alkane) molecules. A naphthenic species is a species containing a cycloalkane hydrocarbon.

In some examples, the liquid carrier is or includes an isoparaffinic liquid with a carbon type, in terms of wt % of paraffinic carbon, as measured in accordance with ASTM D 2140, of 70 wt % or more, in some examples 80 wt % or more, in some examples 90 wt %, in some examples 95 wt % or more, in some examples 99 wt % or more, with the remaining wt % consisting of naphthenic carbon and aromatic carbon, wherein, in some examples, the naphthenic carbon and aromatic carbon together constitute 10 wt % or less of the carbon type, in some examples 5 wt % or less of the carbon type, in some examples 1 wt % or less of the carbon type.

In some examples, the liquid carrier is or includes an isoparaffinic liquid containing isoalkane molecules with a molecular weight of from 100 to 250 Daltons, in some examples from 120 to 220 Daltons, in some examples from 140 to 200 Daltons, in some examples from 160 to 180 Daltons, in some examples about 170 Daltons.

In some examples, the lubricating liquid is or includes a paraffinic liquid containing alkane molecules with a molecular weight of at least 250 Daltons, in some examples from 250 to to 450 Daltons, in some examples from 300 to 400 Daltons, in some examples from 320 to 380 Daltons, in some examples from 340 to 360 Daltons, in some examples about 350 Daltons.

In some examples, the lubricating liquid is or includes a paraffinic liquid with a carbon type, in terms of wt % of paraffinic carbon, as measured in accordance with ASTM D 2140, of 50 wt % or more, in some examples 60 wt % or more, in some examples 60 wt % to 80 wt %, in some examples 65 wt % to 75 wt %, in some examples 66 wt % to 70 wt % with the remaining wt % consisting of naphthenic carbon and aromatic carbon, wherein, in some examples, the aromatic carbon constitutes about 5 wt % or less of the carbon type, in some examples 5 wt % or less of the carbon type, in some examples 1 wt % or less of the carbon type, in some examples 0.5 wt % or less of the carbon type.

In some examples, the liquid carrier is or includes an isoparaffinic liquid having an initial boiling point of less than 250° C. (at standard pressure, e.g. 101325 Pa), in some examples from 120° C. to 240° C., in some examples 150° C. to 230° C., in some examples 170° C. to 210° C., in some examples 180° C. to 200° C., in some examples about 190° C.

In some examples, the lubricating liquid is or includes a paraffinic liquid having an initial boiling point of at least 150° C. (at standard pressure, e.g. 101325 Pa), in some examples at least 200° C., in some examples at least 250° C., in some examples from 150° C. to 350° C., in some examples from 150° C. to 300° C., in some examples from 200° C. to 300° C., in some examples 250° C. to 300° C., in some examples 260° C. to 290° C., in some examples 270° C. to 290° C., in some examples about 277° C.

In some examples of the method, where the lubricating liquid is or includes a paraffinic liquid, after addition of the lubricating liquid to the precursor ink composition, the resultant electrostatic ink composition contains 0.1 to 2 wt/wt % of the paraffinic liquid, in some examples 0.1 to 1 wt/wt % of the paraffinic liquid. in some examples 0.1 to 0.5 wt/wt %.

In some examples of the method, the liquid carrier includes or is an isoparaffinic liquid hydrocarbon with the CAS number 64742-48-9 and the lubricating liquid is or includes a paraffinic liquid having the CAS number 8042-47-5. As used herein, CAS number refers to the Chemical Abstracts Service's Registry Number for the molecule at the time of filing this patent application.

In some examples of the method, the amount of lubricating liquid sprayed onto the surface of the precursor ink composition is such that it the difference between the wt % of the non-volatile solids in the precursor ink composition, before the spraying, and the electrostatic ink composition, after the spraying, is 10 percentage points or less, in some examples 8 percentage points or less, in some examples 8 percentage points or less, in some examples 6 percentage point or less, in some examples 5 percentage points or less, in some examples 4 percentage points or less, in some examples 3 percentage points or less, in some examples 2 percentage points or less, in some examples 1 percentage point or less, in some examples 0.5 percentage points or less.

In some examples of the method, a charge director is added to the liquid carrier before, during or after the spraying of the lubricating liquid onto the surface of the precursor ink composition. In some examples of the method, the lubricating liquid contains a charge director during the spraying of the lubricating liquid onto the surface of the precursor ink composition.

In some examples of the method, the charge director is or includes a species selected from metal salts of fatty acids, metal salts of sulfo-succinates, metal salts of oxyphosphates, metal salts of alkyl-benzenesulfonic acid, metal salts of aromatic carboxylic acids or sulfonic acids, polyoxyethylated alkylamines, phospholipids, polyvinylpyrrolidone, organic acid esters of polyvalent alcohols. In some examples, the charge director is or includes an amphiphilic species. In some examples of the method, the charge director is or includes lecithin.

In some examples the charge director is or includes a sulfosuccinate moiety of the general formula $[R_1—O—C(O)CH_2CH(SO_3^-)C(O)—O—R_2]$, where each of $R_1$ and $R_{2'}$ is an alkyl group. In some examples, the charge director includes nanoparticles of a simple salt and a sulfosuccinate salt of the general formula $MA_n$, wherein M is a metal, n is the valence of M, and A is an ion of the general formula $[R_1—O—C(O)CH_2CH(SO_3^-)C(O)—O—R_2]$, where each of $R_{1'}$ and $R_{2'}$ is an alkyl group.

In some examples, the charge director is added, and may be contained in the lubricating when spraying, until the total amount of charge director is 50 mg or less per g of solids of the electrostatic ink composition, in some examples 40 mg or less per g of solids of the electrostatic ink composition, in some examples 10 mg to 50 mg per g of solids of the electrostatic ink composition, in some examples 20 mg to 40 mg per g of solids of the electrostatic ink composition, in some examples 20 mg to 30 mg per g of solids of the electrostatic ink composition, in some examples 23 mg to 29 mg per g of solids of the electrostatic ink composition, in some examples about 26 per g of solids of the electrostatic ink composition.

In some examples, the precursor ink composition contains a charge director before addition of the lubricating liquid, and the lubricating liquid contains a charge director, and, in some examples, the ratio of [concentration of charge director in the electrostatic ink composition, i.e. after addition of the lubricating liquid to the precursor ink composition]/[concentration of charge director in the precursor ink composition] is at least 1.5, in some examples at least 2, in some examples at least 3, in some examples 2 to 6, in some examples 3 to 5, in some examples 3.5 to 4.5, in some examples about 4. In some examples, the precursor ink composition contains a charge director before addition of the lubricating liquid, and the lubricating liquid contains a charge director, and the charge director in the precursor ink composition is the same as or different from the charge director in the lubricating liquid, and both charge directors may be selected from the charge directors described herein.

In some examples of the method, the lubricating liquid is or includes a liquid that has a higher kinematic viscosity, as measured at 25° C., than the liquid carrier, and the lubricating liquid contains a charge director during the spraying of the lubricating liquid onto the surface of the precursor ink composition.

The spraying may be carried out by any suitable method and the method may produce droplets of the lubricating liquid. The spraying may be effected, for example, by passing the lubricating liquid through a nozzle, jet or orifice to produce a plurality of droplets of the lubricating liquid as it exits the nozzle, jet or orifice.

During or after the spraying, the ink composition may be agitated by mechanical means, e.g. by stirring. This may serve to distribute the lubricating liquid homogenously throughout the ink composition. The stirring may be gentle stirring. In some examples, the stirring involves rotating a stirrer in the ink composition, and the stirrer is rotated at a speed of 500 revolutions per minute (rpm) or less, in some examples 300 rpm or less, in some examples 240 rpm or less, in some examples 120 rpm or less, in some examples 90 rpm or less, in some examples 60 rpm or less, in some examples 45 rpm or less, in some examples 30 rpm or less, in some examples 20 rpm or less, in some examples 15 rpm or less. In some examples, the stirring involves rotating a stirrer in the ink composition, and the stirrer is rotated at a speed of 15 revolutions per minute (rpm) or more, in some examples 15 rpm to 240 rpm, in some examples 15 rpm to 120 rpm.

In some examples of the method, the precursor ink composition is in a receptacle containing 1 kg or more, in some examples 2 kg or more, in some examples 3 kg or more, of the precursor ink composition, and the depth of the precursor ink composition in the receptacle is 5 cm or less. In some examples, the precursor ink composition is in a receptacle containing 1 kg or more, in some examples 2 kg or more, in some examples 3 kg or more, of the precursor ink composition, and the depth of the precursor ink composition in the receptacle is 4 cm or less. In some examples, the precursor ink composition is in a receptacle containing 1 kg or more, in some examples 2 kg or more, in some examples 3 kg or more, of the precursor ink composition, and the depth of the precursor ink composition in the receptacle is 3 cm or less. It has been found that, for a given volume of liquid, if the surface area of the ink composition, upon which the lubricating liquid is sprayed, is increased, this seems to promote a homogenous distribution of the lubricating liquid throughout the ink composition, reduces the mechanical mixing of the lubricating liquid with the carrier liquid, and seems to decrease aggregation of particles of the ink composition.

The lubricating liquid may be sprayed over part of or the whole of the surface of the precursor ink composition. The lubricating liquid may be sprayed in a substantially homogenous manner over the surface of the precursor ink composition, e.g. such that the amount of lubricating liquid sprayed per unit area, e.g. per cm$^2$, on the liquid is substantially the same across the whole surface area of the precursor ink composition.

In some examples of the method, before the spraying, the precursor ink composition includes 31 wt % or more non-volatile solids, or in some examples 33 wt % or more non-volatile solids, or in some examples 35 wt % or more non-volatile solids, or in some examples 37 wt % or more non-volatile solids, or in some examples 39 wt % or more non-volatile solids, or in some examples 40 wt % or more non-volatile solids.

Liquid Carrier

The precursor ink composition includes a liquid carrier. Generally, the liquid carrier can act as a dispersing medium for the other components in the precursor ink composition or electrostatic ink composition when formed. For example, the liquid carrier can include or be a hydrocarbon, silicone oil, vegetable oil, etc. The liquid carrier can include, but is not limited to, an insulating, non-polar, non-aqueous liquid that can be used as a medium for toner particles. The liquid carrier can include compounds that have a resistivity in excess of about 10$^9$ ohm-cm. The liquid carrier may have a dielectric constant below about 5, in some examples below about 3. The liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the liquid carriers include, but are not limited to, aliphatic hydrocarbons, isoparaffinic compounds, paraffinic compounds, dearomatized hydrocarbon compounds, and the like. In particular, the liquid carriers can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™ AF-4™, AF-5™, AF-6™ and AF-7™ (each sold by NIPPON OIL CORPORATION); IP Solvent 1620™ and IP Solvent 2028 (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

In the method, before the spraying of the lubricating liquid, the precursor ink composition includes a certain wt % or more, e.g. 30 wt % or more, non-volatile solids; the liquid carrier may constitute the remaining wt % of the precursor ink composition.

Before printing, in an electrostatic printing process, the liquid carrier can constitute about 20% to 99.5% by weight of the electrostatic ink composition, in some examples 50% to 99.5% by weight of the electrostatic ink composition. The electrostatic ink composition produced in the method herein may be diluted as desired with further liquid carrier before printing in an electrostatic printing process. Before printing, the liquid carrier may constitute about 40 to 90% by weight of the electrostatic ink composition. Before printing, the liquid carrier may constitute about 60% to 80% by weight of the electrostatic ink composition. Before printing, the liquid carrier may constitute about 90% to 99.5% by weight of the electrostatic ink composition, in some examples 95% to 99% by weight of the electrostatic ink composition.

The ink, when printed on the print substrate, may be substantially free from liquid carrier. In an electrostatic printing process and/or afterwards, the liquid carrier may be removed, e.g. by an electrophoresis processes during printing and/or evaporation, such that substantially just solids are transferred to the print substrate. Substantially free from liquid carrier may indicate that the ink printed on the print substrate contains less than 5 wt % liquid carrier, in some examples, less than 2 wt % liquid carrier, in some examples less than 1 wt % liquid carrier, in some examples less than 0.5 wt % liquid carrier. In some examples, the ink printed on the print substrate is free from liquid carrier.

Colorant

The precursor ink composition includes a pigment. The pigments can be any pigment compatible with the liquid carrier and useful for electrostatic printing. For example, the pigment may be present as pigment particles, or may include a resin (in addition to the polymers described herein) and a pigment. The resins and pigments can be any of those commonly used as known in the art. In some examples, the pigment can be a yellow pigment, or a cyan pigment, or a magenta pigment or a black pigment. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200.

The precursor ink composition may include particles comprising the resin and the pigment; the resin and the pigment may be present together in the particles.

Resin

The precursor electrostatic ink composition includes a resin, which may be a thermoplastic resin. A thermoplastic polymer is sometimes referred to as a thermoplastic resin. In some examples, the polymer of the resin, e.g. the thermoplastic resin, may be selected from ethylene or propylene acrylic acid co-polymers; ethylene or propylene methacrylic acid co-polymers; ethylene vinyl acetate co-polymers; co-polymers of ethylene or propylene (e.g. 80 wt % to 99.9 wt %), and alkyl (e.g. C1 to C5) ester of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); co-polymers of ethylene ethylene ethyl acrylate; polyesters; polyvinyl toluene; polyamides; styrene/butadiene co-polymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90 wt %)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin may include a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may include a polymer, in some examples a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SURLYN® ionomers. The polymer including acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The resin may include two different polymers having acidic side groups. The two polymers having acidic side groups may have different acidities, which may fall within the ranges mentioned above. The resin may include a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The resin may include two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The resin may include a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may include a first polymer having a melt viscosity of 15000 poise or more, in some examples 20000 poise or more, in some examples 50000 poise or more, in some examples 70000 poise or more; and in some examples, the resin may include a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may include a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 or AC-5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If the resin in electrostatic ink or ink composition includes a single type of polymer, the polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin includes a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may include two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SURLYN® ionomers. The resin may include (i) a first polymer that is a co-polymer of ethylene and an ethylenically unsaturated acid of either acrylic acid and methacrylic acid, wherein the ethylenically unsaturated acid of either acrylic or methacrylic acid constitutes from 8 wt % to about 16 wt % of the co-polymer, in some examples 10 wt % to 16 wt % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt % to about 30 wt % of the co-polymer, in some examples from 14 wt % to about 20 wt % of the co-polymer, in some examples from 16 wt % to about 20 wt % of the co-polymer in some examples from 17 wt % to 19 wt % of the co-polymer.

The resin may include a polymer having acidic side groups, as described above (which may be free of ester side groups), and a polymer having ester side groups. The polymer having ester side groups may be a thermoplastic polymer. The polymer having ester side groups may further include acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the Bynel® class of monomer, including Bynel 2022 and Bynel 2002, which are available from DuPont®.

The polymer having ester side groups may constitute 1% or more by weight of the total amount of the resin polymers, e.g. thermoplastic resin polymers, in the electrostatic ink composition and/or the ink printed on the print substrate, e.g. the total amount of the polymer or polymers having acidic side groups and polymer having ester side groups. The polymer having ester side groups may constitute 5% or more by weight of the total amount of the resin polymers, e.g. thermoplastic resin polymers, in some examples 8% or more by weight of the total amount of the resin polymers, e.g. thermoplastic resin polymers, in some examples 10% or more by weight of the total amount of the resin polymers, e.g. thermoplastic resin polymers, in some examples 15% or more by weight of the total amount of the resin polymers, e.g. thermoplastic resin polymers, in some examples 20% or more by weight of the total amount of the resin polymers, e.g. thermoplastic resin polymers, in some examples 25% or more by weight of the total amount of the resin polymers, e.g. thermoplastic resin polymers, in some examples 30% or more by weight of the total amount of the resin polymers, e.g. thermoplastic resin polymers, in some examples 35% or more by weight of the total amount of the resin polymers, e.g. thermoplastic resin polymers, in the electrostatic ink composition and/or the ink printed on the print substrate. The polymer having ester side groups may constitute from 5% to 50% by weight of the total amount of the resin polymers, e.g. thermoplastic resin polymers, in the electrostatic ink composition and/or the ink printed on the print substrate, in some examples 10% to 40% by weight of the total amount of the resin polymers, e.g. thermoplastic resin polymers, in the electrostatic ink composition and/or the ink printed on the print substrate, in some examples 5% to 30% by weight of the total amount of the resin polymers, e.g. thermoplastic resin polymers, in the electrostatic ink composition and/or the ink printed on the print substrate, in some examples 5% to 15% by weight of the total amount of the resin polymers, e.g. thermoplastic resin polymers, in the electrostatic ink composition and/or the ink printed on the print substrate in some examples 15% to 30% by weight of the total amount of the resin polymers, e.g. thermoplastic resin polymers, in the electrostatic ink composition and/or the ink printed on the print substrate.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the resin can in some examples be selected from the Nucrel family of toners (e.g. Nucrel 403™, Nucrel 407™ Nucrel 609HS™, Nucrel 908HS™, Nucrel 1202HC™, Nucrel 30707™ Nucrel 1214™, Nucrel 903™, Nucrel 3990™ Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g. Aclyn 201, Aclyn 246, Aclyn 285, and Aclyn 295), and the Lotader family of toners (e.g. Lotader 2210, Lotader, 3430, and Lotader 8200 (sold by Arkema)).

The resin can constitute about 5 to 90%, in some examples about 50 to 80%, by weight of the solids of the electrostatic ink composition and/or the ink printed on the print substrate. The resin can constitute about 60 to 95%, in some examples about 70 to 95%, by weight of the solids of the electrostatic ink composition and/or the ink printed on the print substrate.

Charge Director and Charge Adjuvants

The precursor ink composition may include a charge director. The method as described herein may involve adding a charge director at any stage. In some examples, the precursor ink composition includes a charge director before the spraying of the lubricating liquid, and in some examples the lubricating liquid includes a charge director, which may be the same as or different from, the charge director present in the precursor ink composition before spraying. In some examples, the precursor ink composition does not contain a charge director before the spraying of the lubricating liquid, and in some examples the lubricating liquid includes a charge director. The charge director may be added to impart a charge of positive or negative polarity on the particles, e.g. particles that include the resin and the pigment, in the precursor ink composition and/or electrostatic ink composition. In some examples, the charge director may be selected from ionic compounds, such as metal salts of fatty acids, metal salts of sulfo-succinates, metal salts of oxy-phosphates, metal salts of alkyl-benzenesulfonic acid, metal salts of aromatic carboxylic acids or sulfonic acids, as well as zwitterionic and non-ionic compounds, such as polyoxy-ethylated alkylamines, lecithin, polyvinylpyrrolidone, organic acid esters of polyvalent alcohols, etc. In some examples, the charge director is selected from, but is not limited to, oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates (e.g. see WO 2007/130069). In some examples, the charge director imparts a negative charge on the particles that include the resin and the pigment. In some examples, the charge director imparts a positive charge on the particles that include the resin and the pigment.

In some examples, the charge director includes a sulfosuccinate moiety of the general formula $[R_{1'}-O-C(O)CH_2CH(SO_3^-)C(O)-O-R_{2'}]$, where each of $R_{1'}$ and $R_{2'}$ is an alkyl group. In some examples, the charge director includes nanoparticles of a simple salt and a sulfosuccinate salt of the general formula $MA_n$, wherein M is a metal, n is the valence of M, and A is an ion of the general formula $[R_{1'}-O-C(O)CH_2CH(SO_3^-)C(O)-O-R_{2'}]$, where each of $R_{1'}$ and $R_{2'}$ is an alkyl group, or other charge directors as found in WO2007130069, which is incorporation herein by reference in its entirety. As described in WO2007130069, the sulfosuccinate salt of the general formula $MA_R$ is an example of a micelle forming salt. The charge director may be substantially free or free of an acid of the general formula HA, where A is as described above. The charge director may include micelles of said sulfosuccinate salt enclosing at least some of the nanoparticles. The charge director may include at least some nanoparticles having a size of 200 nm or less, in some examples 2 nm or more. As described in WO2007130069, simple salts are salts that do not form micelles by themselves, although they may form a core for micelles with a micelle forming salt. The ions constructing the simple salts are all hydrophilic. The simple salt may include a cation selected from Mg, Ca, Ba, $NH_4$, tert-butyl ammonium, $Li^+$, and $Al^{+3}$, or from any sub-group thereof. The simple salt may include an anion selected from $SO_4^{2-}$, $PO^{3-}$, $NO_3^-$, $HPO_4^{2-}$, $CO_3^{2-}$, acetate, trifluoroacetate (TFA), $Cl^-$, $Bf$, $F^-$, $ClO_4^-$, and $TiO_3^{4-}$, or from any subgroup thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)_3$, $LiClO_4$ and $LiBF_4$, or any sub-group thereof. The charge director may further include basic barium petronate (BBP).

In the formula $[R_{1'}-O-C(O)CH_2CH(SO_3^-)C(O)-O-R_{2'}]$, in some examples, each of $R_{1'}$ and $R_{2'}$ is an aliphatic alkyl group. In some examples, each of $R_{1'}$ and $R_{2'}$, independently is a $C_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, $R_{1'}$ and $R_{2'}$ are the same. In some examples, at least one of $R_{1'}$ and $R_{2'}$ is $C_{13}H_{27}$. In some examples, M is Na, K, Cs, Ca, or Ba. The formula $[R_{1'}-O-C(O)CH_2CH(SO_3^-)C(O)-O-R_{2'}]$ and/or the formula $MA_n$ may be as defined in any part of WO2007130069.

The charge director may include (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. Another example of a barium sulfonate salt is Barinate B-70, also available from Chemtura. An example isopropyl amine sulphonate salt is dodecyl benzene sulfonic acid isopropyl amine, which is available from Croda.

In some examples, the charge director constitutes about 0.001% to 20%, in some examples 0.01 to 20% by weight, in some examples 0.01 to 10% by weight, in some examples 0.01 to 1% by weight of the solids of the electrostatic ink composition. In some examples, the charge director constitutes about 0.001 to 0.15% by weight of the solids of the electrostatic ink composition, in some examples 0.01 to 0.15%, in some examples 0.05 to 0.02% by weight of the solids of the electrostatic ink composition.

The precursor electrostatic ink composition may include a charge adjuvant. A charge adjuvant may promote charging of particles in the precursor composition and/or electrostatic ink composition when a charge director is present, and may be different from the charge director. The method as described herein may involve adding a charge adjuvant at any stage. In some examples, the charge adjuvant is present in the precursor ink composition before the spraying of the lubricating liquid onto the surface of the precursor ink composition. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or includes aluminum di- or tristearate. The charge adjuvant may be present in an amount of about 0.1 to 5% by weight, in some examples about 0.1 to 1% by weight, in some examples about 0.3 to 0.8% by weight of the solids of the electrostatic ink composition.

In some examples, the precursor ink composition includes particles comprising the resin and the pigment, and the particles may further include a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is Al3+. The fatty acid anion may be selected from a saturated or unsaturated fatty acid anion. The fatty acid anion may be selected from a $C_8$ to $C_{26}$ fatty acid anion, in some examples a $C_{14}$ to $C_{22}$ fatty acid anion, in some examples a $C_{16}$ to $C_{20}$ fatty acid anion, in some examples a $C_{17}$, $C_{18}$ or $C_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

In some examples, the precursor ink composition includes particles comprising the resin and the pigment, and the particles further include a salt of a multivalent cation and a fatty acid anion and the composition further includes a charge director selected from metal salts of sulfo-succinates, metal salts of oxyphosphates, metal salts of alkyl-benzene-sulfonic acid, metal salts of aromatic carboxylic acids or sulfonic acids, as well as zwitterionic and non-ionic compounds, such as polyoxyethylated alkylamines, lecithin, polyvinylpyrrolidone, and organic acid esters of polyvalent alcohols. In some examples, the chargeable particles further include a salt of multivalent cation and a fatty acid anion and the composition further includes a charge director selected oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. In some examples, the electrostatic ink composition includes particles comprising the resin and the pigment, and the particles further include a salt of multivalent cation and a fatty acid anion and the composition further includes a charge director selected from a sulfosuccinate moiety of the general formula [$R_1$—O—C(O)$CH_2$CH($SO_3^-$)C(O)—O—$R_{2'}$], where each of $R_1$ and $R_{2'}$ is an alkyl group, which may be as described above.

The charge adjuvant, which may, for example, be or include a salt of multivalent cation and a fatty acid anion, may be present in an amount of 0.1 wt % to 5 wt % of the solids of the electrostatic ink composition, in some examples in an amount of 0.1 wt % to 2 wt % of the solids of the electrostatic ink composition, in some examples in an amount of 0.1 wt % to 2 wt % of the solids of the electrostatic ink composition, in some examples in an amount of 0.3 wt % to 1.5 wt % of the solids of the electrostatic ink composition, in some examples about 0.5 wt % to 1.2 wt % of the solids of the electrostatic ink composition, in some examples about 0.8 wt % to 1 wt % of the solids of the electrostatic ink composition.

Other Additives

The precursor ink composition and/or electrostatic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

Printing Process and Print Substrate

In some examples, the electrostatic ink composition may be used in a method of electrostatic printing on a print substrate, the method comprising:
  providing the electrostatic ink;
  forming a latent electrostatic image on a surface;
  contacting the surface with the electrostatic ink composition to form a developed toner image on the surface and transferring the toner image to the print substrate.

In some examples, the surface on which the (latent) electrostatic image is formed or developed may be on a rotating member, e.g. in the form of a cylinder. The surface on which the (latent) electrostatic image is formed or developed may form part of a photo imaging plate (PIP). The method may involve passing the electrostatic ink composition of the invention between a stationary electrode and a rotating member, which may be a member having the surface having the (latent) electrostatic image thereon or a member in contact with the surface having the (latent) electrostatic image thereon. A voltage is applied between the stationary electrode and the rotating member, such that particles adhere to the surface of the rotating member. The intermediate transfer member, if present, may be a rotating flexible member, which may be heated, e.g. to a temperature of from 80 to 160° C.

The print substrate may be any suitable substrate. The substrate may be any suitable substrate capable of having an image printed thereon. The substrate may include a material selected from an organic or inorganic material. The material may include a natural polymeric material, e.g. cellulose. The material may include a synthetic polymeric material, e.g. a polymer formed from alkylene monomers, including, but not limited to, polyethylene and polypropylene, and co-polymers such as styrene-polybutadiene. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), mixtures thereof. In an example, the substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print substrate such as paper. The cellulosic print substrate is, in some examples, a coated cellulosic print.

EXAMPLES

The following illustrates examples of the methods and other aspects described herein. Thus, these Examples should not be considered as limitations of the present disclosure, but are merely in place to teach how to make examples of the present disclosure.

In the following examples, the High Tail value of an ink sample is measured using a Malvern Mastersizer 2000, which analyses particle size distribution in a range of 0.05-700 micrometers. When particle size is measured, the particles resemble approximate spheres and their diameter is measured. The results are presented as follows:
  i) Volumetric Split: This is derived from the accumulated particle quantity. The y axis at any point on the accumulated particle quantity graph shows the population (in terms of relative volumetric percentage) of particles with a diameter larger than the diameter displayed on the x axis of the same point.
  ii) Median: The value that splits the population into two equal parts. That is, 50% of the values are above this value while 50% are below.

iii) Population (in terms of relative volume) with a size of less than 1.5 micron.

iv) Population (in terms of relative volume) with a size of more than 20 micron.

The 'high tail' value is defined as "percentage of particles in the ink (by volume) which have a size larger than 20 micron"

The lower tail value is defined as "percentage of particles in the ink (by volume) which have a size smaller than 1.5 micron"

In the following examples, the cyan, magenta, yellow and black inks used are Hewlett Packard ElectroInk™ 4.5 Cyan, Hewlett Packard ElectroInk™ 4.5 Magenta, Hewlett Packard ElectroInk™ 4.5 Yellow, and Hewlett Packard ElectroInk™ 4.5 Black respectively.

In the following examples, Isopar L is Isopar™ L Fluid, produced by ExxonMobil and having CAS Number 64742-48-9. In the following examples, Marcol 82 is Marcol™ 82 White Oil, produced by ExxonMobil and having CAS Number 8042-47-5. In the following examples, NCD is a charge director consisting of three components: soya lecithin at 6.6% w/w, barium sulfonates (Barinate B-70 from Chemtura) at 9.8% w/w, isopropyl amine dodecylebezene sulfonic acid at 3.6% w/w and about 80% w/w isoparaffin (Isopar®-L from Exxon).

Some properties of Isopar L and Marcol 82 are given below in Table I.

TABLE I

|  | Isopar L | Marcol 82 |
|---|---|---|
| MW (Daltons) | ~170 | ~350 |
| Dynamic viscosity@25° C., cP | 1.38 | 30 |
| C-paraffinic, % | 100 | 68 |
| C-naphthenic, % | 0 | 32 |
| Initial boiling point, ° C. | 190 | 277 |

Comparative Example 1

The High Tail values (%) of black, cyan and yellow inks (having % NVS of 35 wt %, 37 wt % and 39 wt %) were measured over a period of 21 days. The samples were stored at 45° C. The results, shown in FIG. 1, indicate an increase in High Tail values (%) as a function of the shelf-life time (days) for all of the inks. The horizontal lines in the Figures represent the specification, i.e. the maximum appropriate % High Tail value desired in the product.

Comparative Example 2

3 kg of yellow ink (having 40% NVS) was spread to a thickness of 2-3 cm and then sprayed with 120 g of Isopar L while the ink particles were mixed, to give homogenous lubricant surface. This resulted in a lubricated ink composition having 37% NVS. The High Tail values (%) of the lubricated ink were measured after five days of storage at 45° C.

Figure 2:
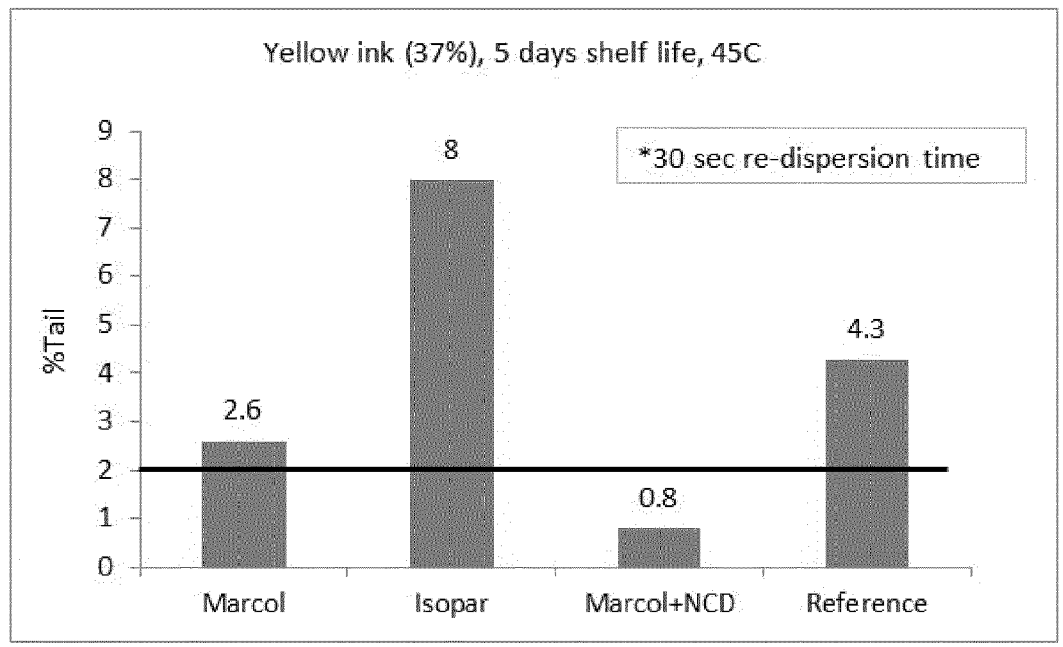
FIG. 2 shows High Tail values (%) for yellow ink (37% NVS) with various lubricant compounds compared to the reference, after 5 days shelf-life at 45° C.

The results, shown in FIG. 2, indicate an increase in % High Tail values for the ink which had been sprayed with Isopar L. For the Isopar L-sprayed ink, the % High Tail value after 5 days shelf-life at 45° C. was 8%, compared to the reference which was 4.3%.

Example 3

3 kg of yellow ink (having 40% NVS) was spread to a thickness of 2-3 cm and then sprayed with 9.6 g of Marcol 82 diluted in 110.4 g of Isopar L, while the ink particles were mixed, to give homogenous lubricant surface. This resulted in a lubricated ink composition having 37% NVS. The High Tail values (%) of the lubricated ink were measured after five days of storage at 45° C.

The High Tail values (%) of the lubricated ink were measured after a period of days of storage at 45° C.

The results, shown in FIG. 2, indicate a decrease in % High Tail values for the ink which had been sprayed with Marcol 82. This suggests that, in the yellow ink at 37% NVS, spraying with Marcol 82 slowed the aggregation process.

Example 4

9.6 g of Marcol 82 and 156.5 g of NCD was mixed well to form a lubricant liquid. 3 kg of yellow ink (having 40% NVS) was spread to a thickness of 2-3 cm and then sprayed with the lubricant liquid while the ink particles were mixed, to give homogenous lubricant surface. This resulted in a lubricated ink composition having 37% NVS. The High Tail values (%) of the lubricated ink were measured after five days of storage at 45° C.

The results, shown in FIG. 2, indicate a further decrease in % High Tail values for the ink which had been sprayed with Marcol 82 and NCD. This suggests that, in the yellow ink at 37% NVS, spraying with Marcol 82 and NCD further slowed the aggregation process.

Further, FIG. 1 shows the % High Tail values of this lubricated ink composition after 2, 12 and 21 days of storage at 45° C.

Example 5

The method of Example 3 was repeated except that cyan ink was used. The spraying step resulted in a lubricating ink composition having 39% NVS.

Figure 3:
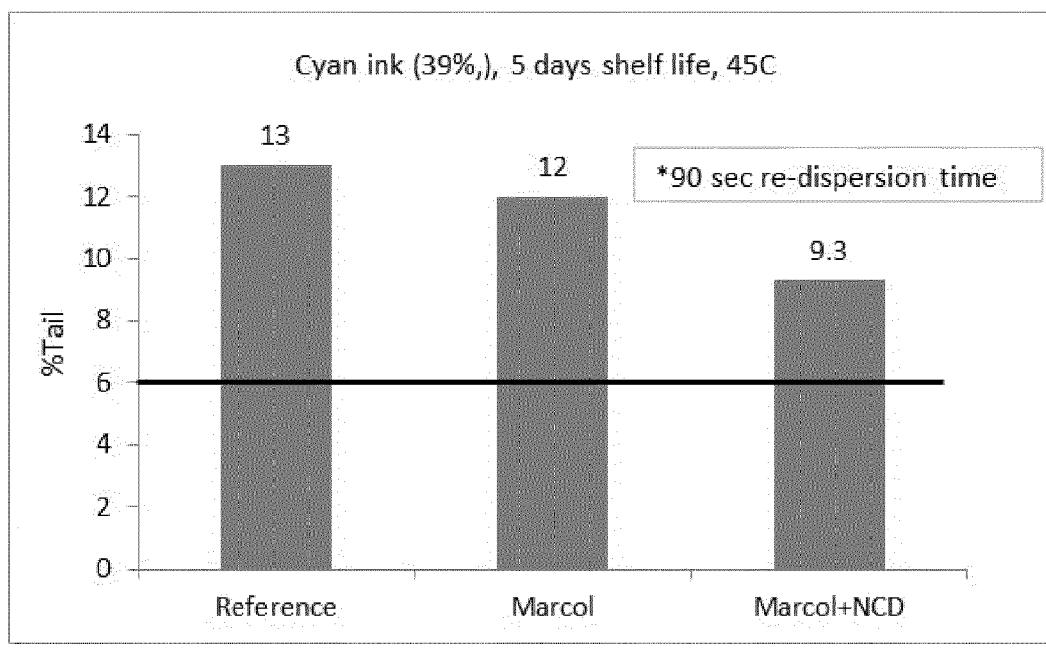
FIG. 3 shows High Tail values (%) for cyan ink (39% NVS) with various lubricant compounds compared to the reference, after 5 days shelf-life at 45° C.

FIG. 3 shows that, in the cyan ink at 39% NVS, spraying with Marcol 82 did not give a great effect compared to the reference (with no lubricant spray).

Example 6

The method of Example 4 was repeated except that cyan ink was used. The spraying step resulted in a lubricating ink composition having 39% NVS.

FIG. 3 shows that, in the cyan ink at 39% NVS, spraying with Marcol 82 and NCD further slowed the aggregation process.

Further, FIG. 1 shows the % High Tail values of this lubricated ink composition after 2, 12 and 21 days of storage at 45° C. This ink is indicated by "37% spray" in the legend of FIG. 1 (the other values in legend refer to the inks of Comparative Example 1, i.e. without Marcol 82 having been sprayed onto the inks).

Example 7

The method of Example 3 was repeated except that magenta ink was used. The spraying step resulted in a lubricating ink composition having 37% NVS.

Figure 4:
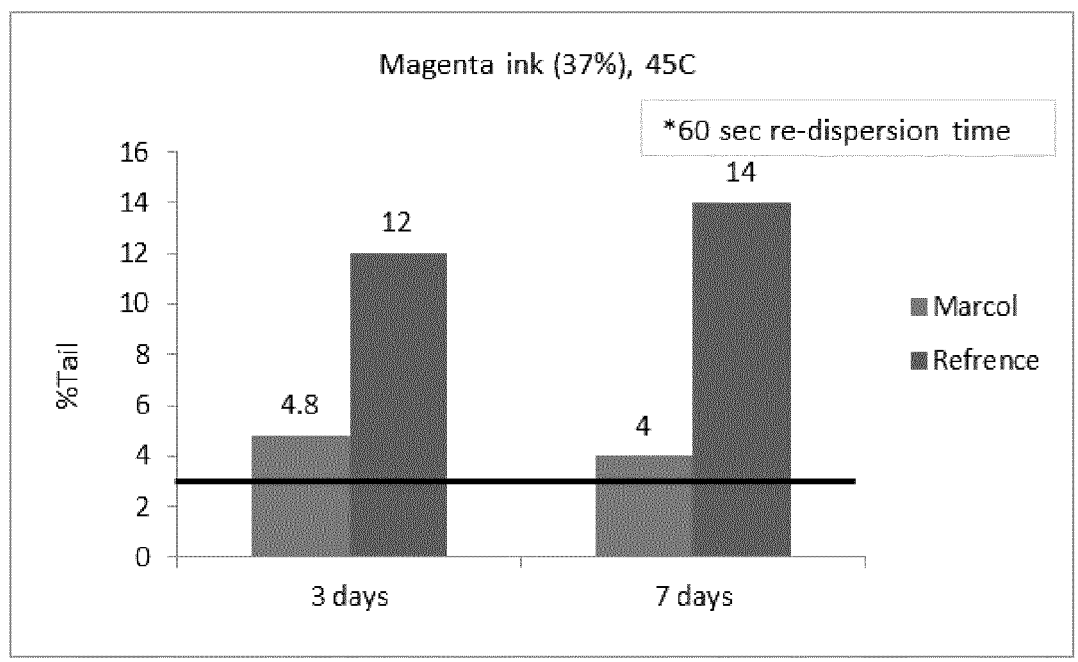
FIG. 4 shows High Tail values (%) for magenta ink (37% NVS) having been sprayed with Marcol compared to the reference, after 3 days and 7 days shelf-life at 45° C.

FIG. 4 shows that, in the magenta ink at 37% NVS, spraying with Marcol 82 further slowed the aggregation process.

Example 8

The method of Example 4 was repeated except that black ink was used, and the % High Tails value was measured after a period of storage of 2, 12 and 21 days at 45° C.

FIG. 1 shows that, in the black ink at 37% NVS, spraying with Marcol 82 and NCD slowed the aggregation process.

While the methods and related aspects have been described with reference to certain examples, those skilled in the art will appreciate that various modifications, changes, omissions, and substitutions can be made without departing from the spirit of the disclosure. It is intended, therefore, that the methods and related aspects be limited by the scope of the following claims. The features of any dependent claim may be combined with the features of any of the other dependent claims.

The invention claimed is:

1. A method of producing an electrostatic ink composition, the method comprising:
   providing a precursor ink composition comprising a resin and a pigment dispersed in a liquid carrier; wherein the precursor ink composition comprises 30 wt % or more non-volatile solids; and
   spraying a lubricating liquid onto the surface of the precursor ink composition to form the electrostatic ink composition, wherein the lubricating liquid is or comprises a liquid that has a higher kinematic viscosity, as measured at 25° C., than the liquid carrier.

2. The method according to claim 1, wherein the lubricating liquid is or comprises a liquid that has a kinematic viscosity, as measured at 25° C., that is at least twice that of the liquid carrier.

3. The method according to claim 1, wherein the lubricating liquid is or comprises a liquid that has a kinematic viscosity, as measured at 25° C., that is at least five times that of the liquid carrier.

4. The method according to claim 1, wherein the lubricating liquid is or comprises a liquid that has a kinematic viscosity, as measured at 25° C., that is at least ten times that of the liquid carrier.

5. The method according to claim 1, wherein the liquid carrier comprises or is an isoparaffinic liquid and the lubricating liquid is or comprises a paraffinic liquid.

6. The method according to claim 1, wherein the liquid carrier is or includes an isoparaffinic liquid containing isoalkane molecules with a molecular weight of from 120 to 220 Daltons and, the lubricating liquid is or includes a paraffinic liquid containing alkane molecules with a molecular weight of at least 250 Daltons.

7. The method according to claim 1, wherein the amount of lubricating liquid sprayed onto the surface of the precursor ink composition is such that the difference between the wt % of the non-volatile solids in the precursor ink composition, before the spraying, and the electrostatic ink composition, after the spraying, is less than 6 percentage points.

8. The method according to claim 1, wherein a charge director is added to the liquid carrier before, during or after the spraying of the lubricating liquid onto the surface of the precursor ink composition.

9. The method according to claim 1, wherein the lubricating liquid contains a charge director during the spraying of the lubricating liquid onto the surface of the precursor ink composition.

10. The method according to claim 8, wherein the charge director is or comprises a species selected from metal salts of fatty acids, metal salts of sulfo-succinates, metal salts of oxyphosphates, metal salts of alkyl-benzenesulfonic acid, metal salts of aromatic carboxylic acids or sulfonic acids, polyoxyethylated alkylamines, phospholipids, polyvinylpyrrolidone, or organic acid esters of polyvalent alcohols.

11. The method according to claim 8, wherein the charge director comprises lecithin.

12. The method according to claim 1, wherein the lubricating liquid contains a charge director during the spraying of the lubricating liquid onto the surface of the precursor ink composition.

13. The method according to claim 1, wherein the precursor ink composition is in a receptacle containing 1 kg or more of the precursor ink composition, and the depth of the precursor ink composition in the receptacle is 5 cm or less.

14. The method according to claim 1, wherein, before the spraying, the precursor ink composition comprises 35 wt % or more non-volatile solids.

15. The method according to claim 9, wherein the charge director is or comprises a species selected from metal salts of fatty acids, metal salts of sulfo-succinates, metal salts of oxyphosphates, metal salts of alkyl-benzenesulfonic acid, metal salts of aromatic carboxylic acids or sulfonic acids, polyoxyethylated alkylamines, phospholipids, polyvinylpyrrolidone, or organic acid esters of polyvalent alcohols.

16. The method according to claim 9, wherein the charge director comprises lecithin.

17. The method according to claim 1, wherein the lubricating liquid has a kinematic viscosity, as measured at 25° C., that is at least 3 mm$^2$/s more than the kinematic viscosity of the liquid carrier.

18. The method according to claim 5, wherein the lubricating liquid further comprises naphthenic species.

19. The method according to claim 1, wherein the method further comprises agitating the electrostatic ink composition after spraying a lubricating liquid onto the surface of the precursor ink composition.

* * * * *

UNITED STATES PATENT AND TRADEMARK OFFICE
CERTIFICATE OF CORRECTION

PATENT NO. : 9,770,738 B2  
APPLICATION NO. : 14/888407  
DATED : September 26, 2017  
INVENTOR(S) : Eyal Bachar et al.

Page 1 of 1

It is certified that error appears in the above-identified patent and that said Letters Patent is hereby corrected as shown below:

In Fig. 4, Sheet 3 of 3, delete "Refrence" and insert -- Reference --, therefor.

Signed and Sealed this  
Tenth Day of April, 2018

Andrei Iancu  
*Director of the United States Patent and Trademark Office*